(12) United States Patent
Hua

(10) Patent No.: US 11,592,576 B2
(45) Date of Patent: Feb. 28, 2023

(54) METHOD FOR ACQUIRING MULTIPLE SATELLITES USING PREVIOUSLY EXPLORED SEARCH SPACE

(71) Applicant: STAR ALLY INTERNATIONAL LIMITED, Tortola (VG)

(72) Inventor: Wensheng Hua, Fremont, CA (US)

(73) Assignee: STAR ALLY INTERNATIONAL LIMITED, Tortola (VG)

( * ) Notice: Subject to any disclaimer, the term of this patent is extended or adjusted under 35 U.S.C. 154(b) by 113 days.

(21) Appl. No.: 16/870,488

(22) Filed: May 8, 2020

(65) Prior Publication Data

US 2020/0355835 A1  Nov. 12, 2020

Related U.S. Application Data

(60) Provisional application No. 62/964,950, filed on Jan. 23, 2020, provisional application No. 62/846,240, filed on May 10, 2019.

(51) Int. Cl.

| | |
|---|---|
| *G01S 19/29* | (2010.01) |
| *G01S 19/43* | (2010.01) |
| *G01S 19/37* | (2010.01) |
| *G01S 19/39* | (2010.01) |
| *G01S 19/30* | (2010.01) |

(52) U.S. Cl.
CPC .............. *G01S 19/29* (2013.01); *G01S 19/30* (2013.01); *G01S 19/37* (2013.01); *G01S 19/393* (2019.08); *G01S 19/43* (2013.01)

(58) Field of Classification Search
CPC ........ G01S 19/29; G01S 19/393; G01S 19/30; G01S 19/37
See application file for complete search history.

(56) References Cited

U.S. PATENT DOCUMENTS

| | | | | |
|---|---|---|---|---|
| 5,418,538 | A | * | 5/1995 | Lau .................... G01S 19/29 342/357.75 |
| 5,917,444 | A | * | 6/1999 | Loomis ............... G01S 19/29 342/357.75 |
| 6,114,992 | A | * | 9/2000 | Underbrink .......... G01S 19/29 342/357.67 |

(Continued)

OTHER PUBLICATIONS

Kaplan et al., "Understanding GPS Principles and Applications", Artech House, 2nd edition, 2006 (Year: 2006).*

(Continued)

*Primary Examiner* — Cassi J Galt
(74) *Attorney, Agent, or Firm* — Edward C. Kwok; VLP Law Group LLP

(57) ABSTRACT

A satellite positioning receiver includes a local oscillator, a front-end circuit with having an analog mixer, a number of signal processing channel circuits, and a processing circuit. The satellite positioning receiver performs a method that includes (i) acquiring a first satellite using a first frequency search space that spans both uncertainties due to the first satellite's orbit and uncertainties due to the clock bias or a time rate of change of the bias; and (ii) using the bias or the time derivative of the bias determined during the acquisition of the first satellite, acquiring a second satellite using a second frequency search space that spans substantially only uncertainties due to the second satellite's orbit.

22 Claims, 6 Drawing Sheets

(56) References Cited

U.S. PATENT DOCUMENTS

| | | | |
|---|---|---|---|
| 6,836,241 B2 * | 12/2004 | Stone | G01S 19/24 342/357.63 |
| 8,665,149 B2 * | 3/2014 | Joo | G01S 19/235 342/357.63 |
| 2004/0176099 A1 * | 9/2004 | Sahai | G01S 19/30 455/456.2 |
| 2007/0109188 A1 | 5/2007 | Zimmerman et al. | |
| 2011/0312334 A1 * | 12/2011 | Yajima | G01S 19/24 455/456.1 |
| 2017/0115400 A1 | 4/2017 | Nayyar et al. | |
| 2017/0329017 A1 | 11/2017 | Hu | |
| 2018/0100918 A1 | 4/2018 | Davis et al. | |

OTHER PUBLICATIONS

"PCT Search Report and Written Opinion, PCT/US2020/032175", dated Aug. 11, 2020, 15 pages.

* cited by examiner

METHOD FOR ACQUIRING MULTIPLE SATELLITES USING PREVIOUSLY EXPLORED SEARCH SPACE

CROSS REFERENCE TO RELATED APPLICATIONS

The present invention relates to and claims priority of (i) U.S. provisional patent application, Ser. No. 62/846,240, entitled "System and Method For Time-of-Flight Determination Using Categorization of Both Code and Phase in Received Signal," filed on May 10, 2019; and (ii) U.S. provisional patent application, Ser. No. 62/964,950, entitled "System and Method For Time-of-Flight Determination Using Categorization of Both Code and Phase in Received Signal," filed on Jan. 23, 2020.

The present invention also relates to U.S. patent application ("Related Application"), Ser. No. 16/587,779, entitled "System and Method of Time of Flight Detection," filed on Sep. 30, 2019, which is a continuation application of U.S. patent application Ser. No. 16/359,315, entitled "System and Method of Time of Flight Detection," filed on Mar. 20, 2019, now U.S. Pat. No. 10,477,353, which is a continuation application of U.S. patent application Ser. No. 15/661,477, entitled "System and Method of Time of Flight Detection," filed on Jul. 27, 2017, now U.S. Pat. No. 10,285,009, which is a continuation application of U.S. patent application Ser. No. 15/220,360, entitled "System and Method of Time of Flight Detection," filed on Jul. 26, 2016, now U.S. Pat. No. 9,723,444, which is a continuation application of U.S. patent application Ser. No. 14/826,128, entitled "System and Method of Time of Flight Detection," filed on Aug. 13, 2015, now U.S. Pat. No. 9,439,040, which claims priority of U.S. provisional patent application, Ser. No. 62/037,607, entitled "System and Method of Time of Flight Detection," filed on Aug. 13, 2014. The Related application is hereby incorporated by reference in its entirety.

BACKGROUND OF THE INVENTION

1. Field of the Invention

The present invention relates to processing of a received signal to determine the distance from the source of the signal. In particular, the present invention relates to processing a direct-sequence code-division multiple access (CDMA) signal to determine the receiver's distance from its source of the signal, using both its code sequence and its phase.

2. Discussion of the Related Art

The location of a signal receiver at any given time may be very accurately triangulated using signals received from a number of signal-transmitting satellites which positions are known at that time to high precision. At the current time, the satellites available for location determination include those sent from the Beidou, the Glonass, the GNSS and the GPS systems. Each satellite in the GPS system, for example, transmit a "probe signal," which includes a 1575.42 MHz carrier signal modulated by a 1023-chip pseudo-random (PRN) code and navigation data at 1.023 MHz and 50 bps, respectively. Based on the detected transit time of the probe signal ("time of flight" or "code delay") between the satellite and the receiver, the receiver can accurately determine its distance from the satellite. Detection of signals from multiple satellites (e.g., 5 or more) allow the receiver to accurately determines its location by triangulation.

SUMMARY OF THE INVENTION

According to one embodiment of the present invention, a method for detecting a probe signal at an estimated code delay and an estimated doppler frequency includes: (i) dividing a period of the probe signal into sections each of a predetermined duration; (ii) assigning to each section one of a multiple code categories, each code category being indicative of a signal pattern of the probe signal within the section; and (iii) selecting multiple phase categories for a sinusoidal signal, each phase category being indicative of a range of phases in the sinusoidal signal. Thereafter, the method includes (i) receiving a signal from which the probe signal is to be detected; (ii) dividing the received signal into sections each of the predetermined duration; (iii) assigning each section of the received signal both a corresponding code category and a corresponding phase category, based respectively on the estimated code delay and the doppler frequency; and (iv) separately accumulating sections of the received signal according to the assigned code and phase categories of each section. In some embodiments, the predetermined duration of each section of the received signal or of the probe signal may be up to one chip, with each section of the received signal including multiple samples each represented by in-phase and quadrature components in accordance with a predetermined sampling rate. The probe signal may have modulated thereon repeated cycles of a pseudorandom code.

According to one embodiment of the present invention, an integrated circuit for detecting a probe signal in a received signal, includes: (a) a memory circuit for storing one or more sections of the received signal, each section having a predetermined duration; (b) numerous processing circuits, each including one or more individually addressable accumulators; and (c) a dispatch circuit including (i) storage elements for storing code categories each being assigned to a corresponding one of consecutive sections of the probe signal, each section of the probe signal having the predetermined duration and each code category being indicative of a signal transition pattern of the probe signal within the corresponding section; and (ii) a code counter circuit which maps each section of the received signal to a corresponding one of the code categories in the storage elements based on an estimated code delay between the probe signal and the received signal; and (iii) a phase counter circuit which maps each section of the received signal to a corresponding one of a plurality of phase categories of a sinusoidal signal based on an estimated doppler frequency between the received signal and the probe signal, wherein the dispatch circuit maps each section of the received signal to one of the addressable accumulators based on the corresponding code category and the corresponding phase category.

In one embodiment of the present invention, each accumulator in each processing unit separately accumulates the in-phase and quadrature components of each sample separately, the accumulator further comprising vector registers, vector summers and vector accumulation elements for the separate accumulations.

In one embodiment of the present invention, the integrated circuit further includes a control circuit which causes the code categories of the probe signal be stored into the storage elements. The control circuit provides overall control of the circuit elements in the integrated circuit and allocate resources (e.g., the accumulator circuits in each processing unit) for the probe signal detection. The dispatch circuit may also include a code category generation circuit which determines the code categories in the storage elements based on a pseudorandom code specified by the control circuit. Alternatively, the code categories may be generated by the control circuit executing software or firmware. Furthermore, the dispatch circuit may further include a gold code generator.

In one embodiment of the present invention, the the control circuit may be provided by a microprocessor or microcontroller in a system-on-a-chip manner.

According to one embodiment of the present invention, the dispatch circuit includes multiple sets of storage elements, code counter circuits and phase counter circuits for detecting multiple probe signals, multiple estimated code delays and multiple estimated doppler frequencies.

The present invention is better understood upon consideration of the detailed discussion below in conjunction with the accompanying drawings.

BRIEF DESCRIPTION OF THE DRAWINGS

FIG. 1b shows exemplary implementation 150 of each of channels 103-1, 103-2, . . . and 103-n of FIG. 1a.

DETAILED DESCRIPTION OF THE PREFERRED EMBODIMENTS

Figure 1A:
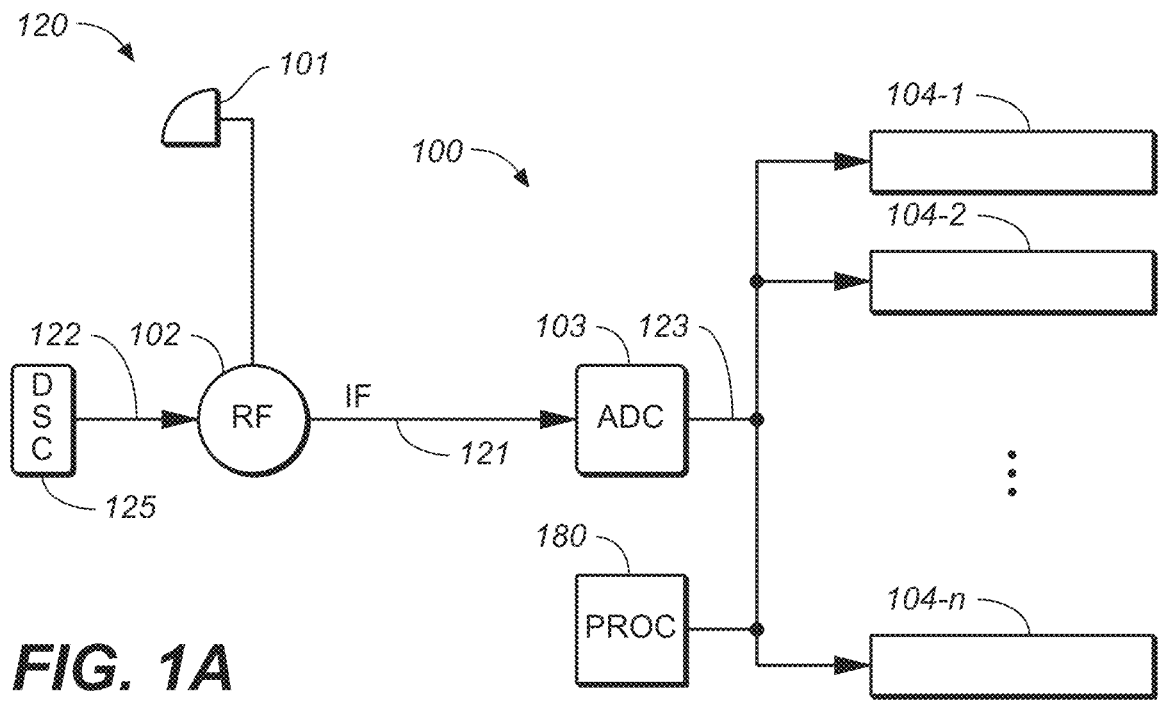
FIG. 1a is a block diagram representing the signal processing circuits 100 of a GPS receiver.

FIG. 1a is a block diagram representing the signal processing circuits 100 of a GPS receiver. As shown in FIG. 1a, antenna 101 receives a satellite signal 120, which is down-converted by mixing the received signal 120 with local oscillator-generated signal 122 in radio frequency (RF) front end circuit 102 to intermediate frequency (IF) signal 121 (e.g., 4 MHz). Local oscillator-generated signal 122 may be implemented, for example, by oscillator 125 (e.g., a temperature-compensated crystal oscillator ("TCXO")). This down-conversion may be accomplished, for example, by mixing received signal 120 in an analog mixer in RF front end circuit 102 with locally generated signal 122 (e.g., a 1471.42 MHz signal). The present invention is applicable to processing signals from satellites of multiple constellations, e.g., GPS, GLONASS, Galileo and Beidou. As the constellations use several different carrier frequencies, IF signal 121 include signals from different constellations modulated by slightly different intermediate frequencies.

IF signal 121 is then sampled (e.g., at 32 MHz) in analog-to-digital (ADC) circuit 103 to obtain digitized signal 123, which is then provided to each of channels 104-1, 104-2, . . . , and 104-n for detection in parallel. In many implementations, digitized signal 123 is provided in complex form—i.e., in in-phase (I) and quadrature (Q) representations (e.g., 2 bits in each of the I and Q components). The movement of the satellite relative to the receiver result in a shift $f_D$ in frequency ("doppler frequency") in received signal 120. In many applications, the doppler frequency is typically determined to be in the ±5 KHz range. Typically, to detect received signal 120, at any given time, channels 104-1, 104-2, . . . , and 104-n each test as hypothesis both an estimated code delay and a doppler shift.

Figure 1B:
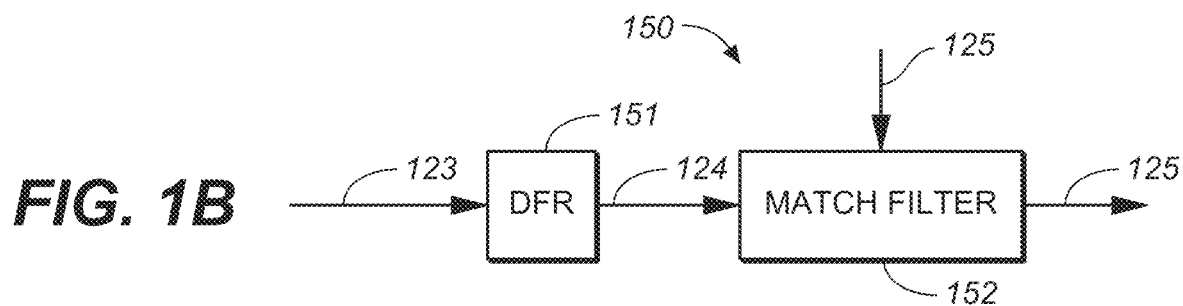

FIG. 1b shows exemplary implementation 150 of each of channels 104-1, 104-2, . . . and 104-n of FIG. 1a. As shown in FIG. 1b, channel implementation 150 includes doppler frequency removal circuit 151 and a match filter circuit 152. Doppler frequency removal circuit 151 multiplies digitized received signal 123 to digital samples of a sinusoidal signal of the estimated doppler frequency to provide doppler frequency-removed input signal 124. Match filter circuit 151 calculates correlation value 125 between the doppler frequency-removed input received signal and a replica of the PRN code of the probe signal at an estimated code delay. A satellite is deemed detected at the estimated code delay and the estimated doppler frequency when output value 125 of match filter circuit 152 is significantly greater than a background noise level.

Processor 180 of FIG. 1a may be used to process the code delays of the detected satellites to determine the position, velocity and a GPS time for the receiver. Processor 180 may be implemented, for example, by any microprocessor (e.g., a microprocessor customized for signal processing or a general-purpose microprocessor), or any suitable host computer.

Figure 2A:
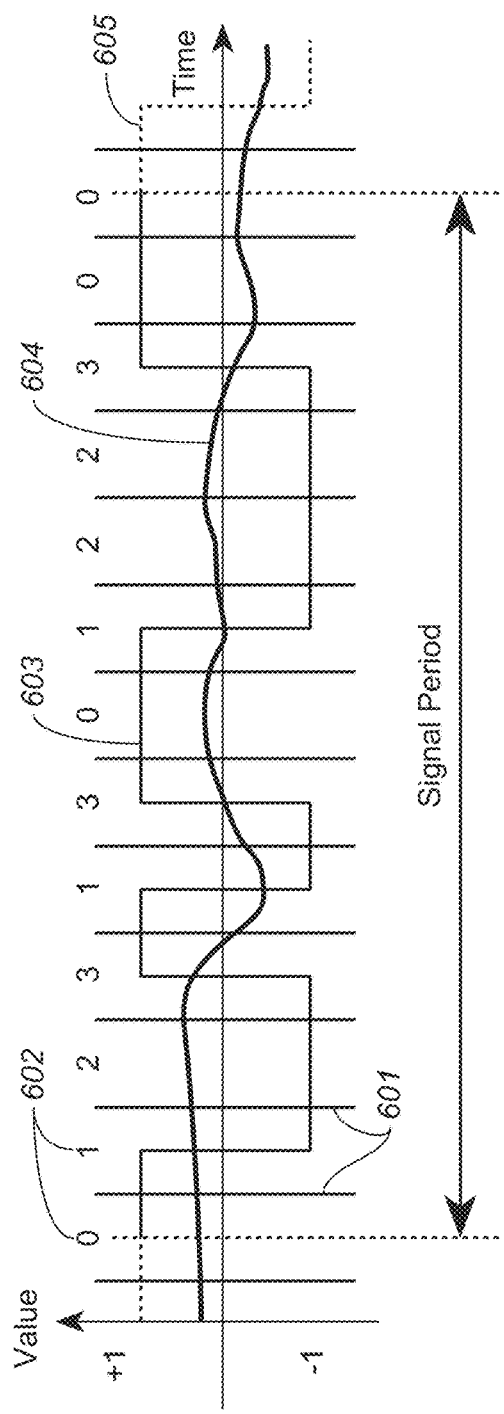
FIG. 2a illustrates by which samples of exemplary 12-chip PRN code 603 is divided in time into sections.

A highly efficient method for calculating the correlation is disclosed in the Related Application, which is incorporated by reference above. The Related Application teaches methods—one of which is illustrated herein in conjunction with FIG. 2a—in which samples of exemplary 12-chip PRN code 603 are divided according to time into sections. (To be sure. PRN code 603 in FIG. 2a is constructed merely for the purpose of illustration; any actual PRN code of any probe signal, e.g., from a GPS satellite, has a considerably greater number of chips (i.e., code length).) FIG. 2a also shows received signal 604 aligned to the PRN code 603 at the estimated code delay; received signal 604 has been down-converted and with doppler frequency removed. Section boundaries 601 are each set at the mid-point of a corresponding chip in the 12-chip PRN code of probe signal 603. Each section lasts one chip time (t). As shown in FIG. 2a, each section is categorized according to the bit transitions in PRN code 603 within the section. For example, neighboring sections 602 are categorized to categories '0' and '1'. The categories of the remainder sections are similarly labeled. In the example of FIG. 2a, category k of each section may be any one of four categories: (a) k=0, when all signal values within the section equal to the +1 level; (b) k=1, when the signal values within the section transition once from the +1 level to the −1 level; (c) k=2, when all signal values within the section equal the −1 level; and (d) k=3, when the signal values within the section transitions from the +1 level to the −1 level.

In the disclosed methods of the Related Application, samples in each section of received signal 604 are accumulated in an accumulator corresponding to the category of the that section. For example, according to the categorization scheme in FIG. 2a, four accumulators, each corresponding to one of the four categories, may be used to accumulate in parallel the samples of the correspondingly categorized sections of received signal 604. In each accumulator, a detected signal (i.e., the estimated code delay and the estimated doppler frequency are close to the actual code delay and the actual doppler frequency) results in the cumulative samples in each accumulator conform to the waveform of the corresponding bit transitions in the PRN code within the section.

Figure 2B:
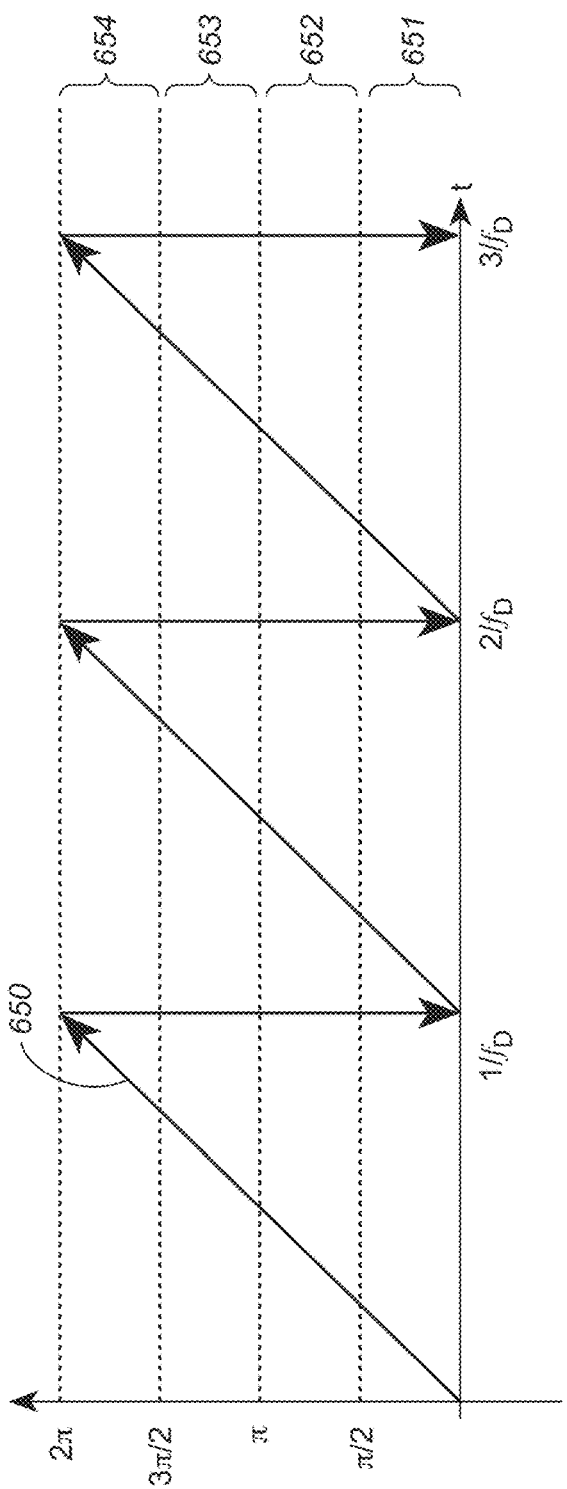
FIG. 2b shows the phase change (modulo 2π) of sinusoidal signal 650 of frequency $f_D$, over 3 periods.

The present invention extends the methods of the Related Application to eliminate the need for a separate step that removes the doppler frequency. FIG. 2b shows the phase change (modulo $2\pi$) of sinusoidal signal 650 of frequency $f_D$, over 3 periods (i.e., between time 0.0 to time $3.0/f_D$). As shown in FIG. 2b, the phase of sinusoidal signal 650 increases linearly with time form 0 to $2\pi$ within each signal period. Within each signal period, the phase of sinusoidal signal 650 at any time may be assigned to one of any number of "phase categories." For example, in FIG. 2b, the phase of sinusoidal signal 650 may all into one of four phase categories—i.e., (i) between 0.0 and $\pi/2$, indicated by interval 651, (ii) between $\pi/2$ and $\pi$, indicated by interval 652, (iii) between $\pi$ and $3\pi/2$, indicated by interval 653, and (iv) between $3\pi/2$ and $2\pi$ (i.e., 0.0), indicated by interval 653. FIG. 2b illustrates mapping the phase changes in each cycle of the sinusoidal signal over time into four phase categories merely for illustration purpose. The phase changes in each cycle of the sinusoidal signal may be mapped into any number of phase categories. For example, the phase categories in each cycle of the sinusoidal signal may be mapped to eight phase categories—i.e., (i) between 0.0 and $\pi/4$, (ii) between $\pi/4$ and $\pi/2$, (iii) between $\pi/2$ and $3\pi/4$, (iv) between $3\pi/4$ and $\pi$, (v) between $\pi$ and $5\pi/4$, (vi) between $5\pi/4$ and $3\pi/2$, (vii) between $3\pi/2$ and $7\pi/4$, and (viii) between $7\pi/4$ and $2\pi$.

According to one embodiment of the present invention, received signal 604 of FIG. 2a may also be divided in time into sections that are categorized, not only to the code categories, as discussed above in conjunction with FIG. 2a, but also to the phase categories. In other words, in each section of received signal 604 may be assigned a composite category (c, p), where c is the code category and p is the phase category. So assigned, the samples of each section of received signal 604 assigned to composite category (c, p) may be accumulated in an accumulator assigned to that composite category. In each accumulator, a detected signal results in the cumulative samples in the accumulator conforming to the phase and quadrature waveforms of the corresponding down-converted probe signal at the estimated code delay and at the estimated doppler frequency. Using the four code categories and the four phase categories of FIGS. 2a and 2b, according to one embodiment of the present invention, sixteen accumulators may be used to perform the corresponding accumulations in parallel. In GPS applications, where the doppler frequency is typically between ±5 KHz and where each chip has a duration of 1.0 microsecond, the phase category changes infrequently within the code period. Therefore, according to one embodiment of the present invention, for GPS application, one may use the same 1-chip duration to create signal sections, as illustrated in FIG. 2a.

According to one embodiment of the present invention, the following method illustrates detection of a probe signal at an estimated code delay and an estimated doppler frequency:
(i) dividing a period of the probe signal into sections of a predetermined duration;
(ii) assigning to each section one of a plurality of code categories, each code category being indicative of a signal pattern of the probe signal within the section;
(iii) selecting a plurality of phase categories for a sinusoidal signal, each phase category being indicative of a range of phases in the sinusoidal signal;
(iv) receiving a signal from which the probe signal is to be detected;
(v) dividing the received signal into sections each of the predetermined duration;
(v) assigning each section of the received signal both a corresponding code category and a corresponding phase category, based respectively on the estimated code delay and the doppler frequency; and
(vi) separately accumulating sections of the received signal according to the assigned code and phase categories of each section.

Step (vi) may be carried out, for example, by providing an accumulator to each composite category (c, p), where c is a code category and p is a phase category. Such an arrangement takes advantage of parallelism to achieve high performance and efficiency.

Figure 3A:
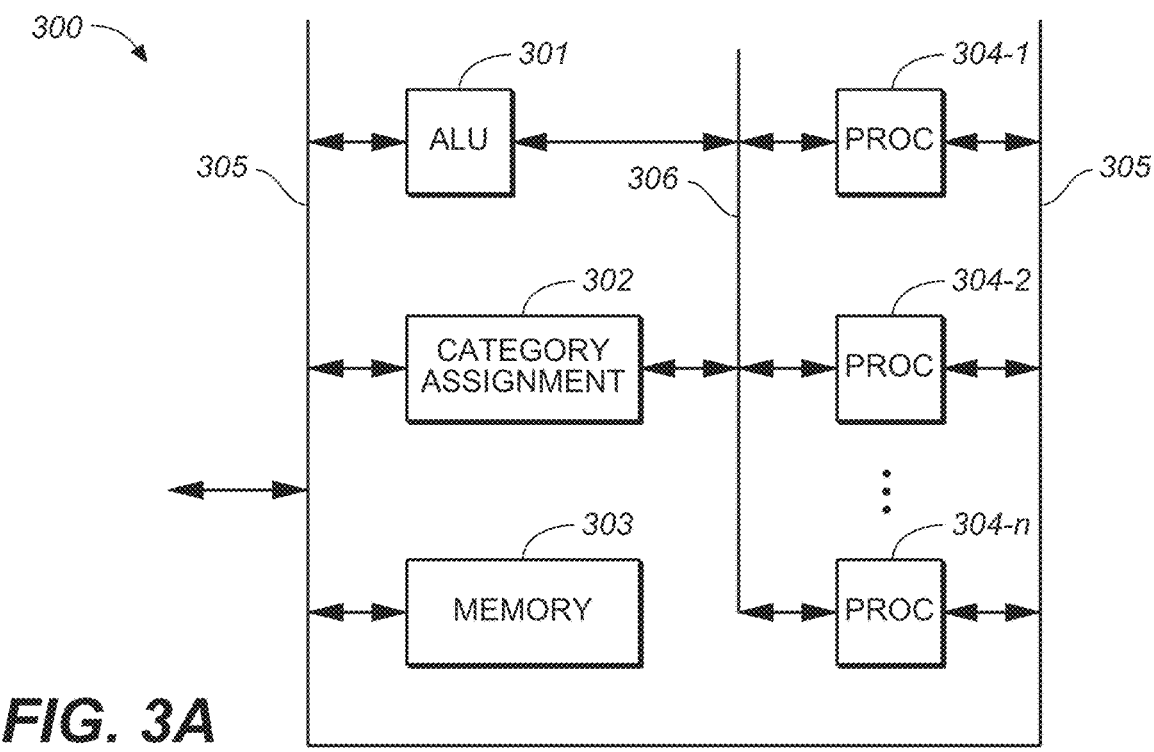
FIG. 3a shows a block diagram of digital circuit 300, which includes arithmetic logic unit 301, dispatch circuit (or category assignment circuit) 302, memory circuit 303 and processing circuits 304-1, 304-2, . . . 304-n, in accordance with one embodiment of the present invention.
Figure 3B:
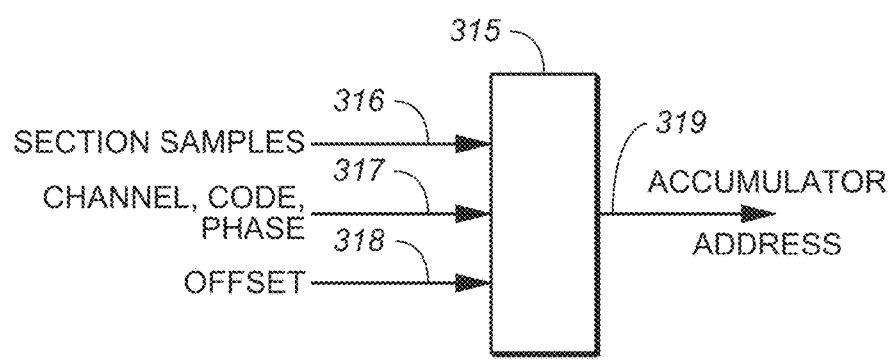
FIG. 3b shows functional representation 315 of dispatch circuit 302 during section accumulations.
Figure 3C:
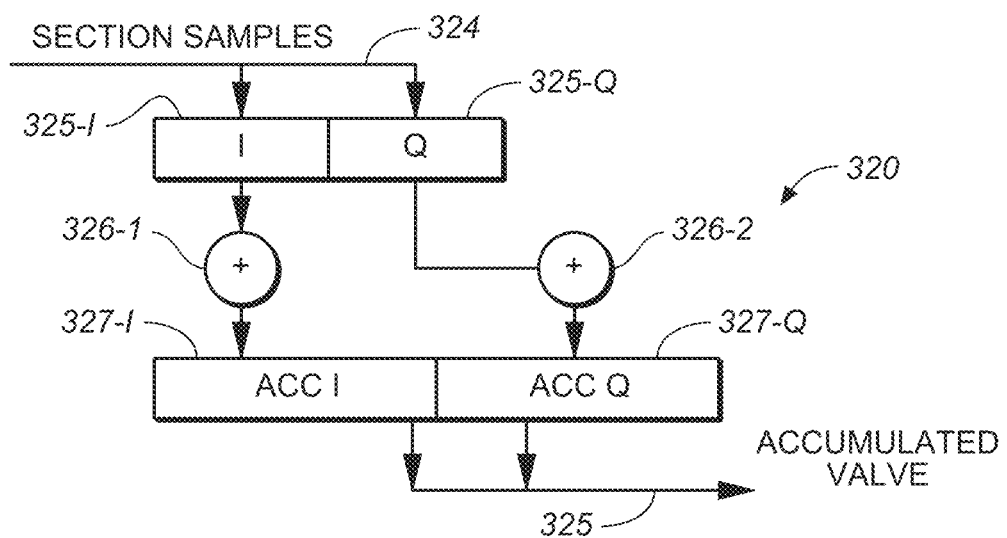
FIG. 3c shows implementation 320 of an accumulator for supporting accumulation in any of processing circuits 304-1, 304-2, . . . and 304-n, in accordance with one embodiment of the present invention.

According to one embodiment of the present invention, the methods of the present invention may be carried out in a dedicated digital circuit, such as illustrated by digital circuit 300 of FIGS. 3s-3c. FIG. 3a shows a block diagram of digital circuit 300, which includes central processing unit (CPU) 301, dispatch circuit (or category assignment circuit) 302, memory circuit 303 and processing circuits 304-1, 304-2, . . . 304-n, in accordance with one embodiment of the present invention. Digital circuit 300 may be used for searching multiple probe signals from multiple signal sources ("channels") simultaneously. Data (e.g., digitized received signals, PRN codes and output data) may be received into, distributed throughout or sent out from digital circuit 300 over system bus 305. Internal bus 306 provides for communication of internal data and control signals among the circuits of digital circuit 300.

In some embodiments CPU 301 may be any general-purpose microprocessor or micro-controller (e.g., of ARM architecture), often available as configurable circuit module that can be directly integrated into a custom "system-on-a-chip" integrated circuit. In some embodiments, CPU 301 may be a custom control circuit capable of performing selected arithmetic and logic functions. According to one embodiment of the present invention, CPU 301 configures and controls the operations of the circuits in digital circuit 300. In some embodiments, processing circuit 304-1, 304-2, . . . and 304-n each include one or more accumulator circuits each suitable for use for accumulating samples in a section of a received signal, as described in further detail below. CPU 301 may allocate, for example, each such accumulator for use at any given time for accumulating sections of the received signal for a specified channel, a specified composite category and a specified pair of estimated code delay and estimated doppler frequency.

Figure 3D:
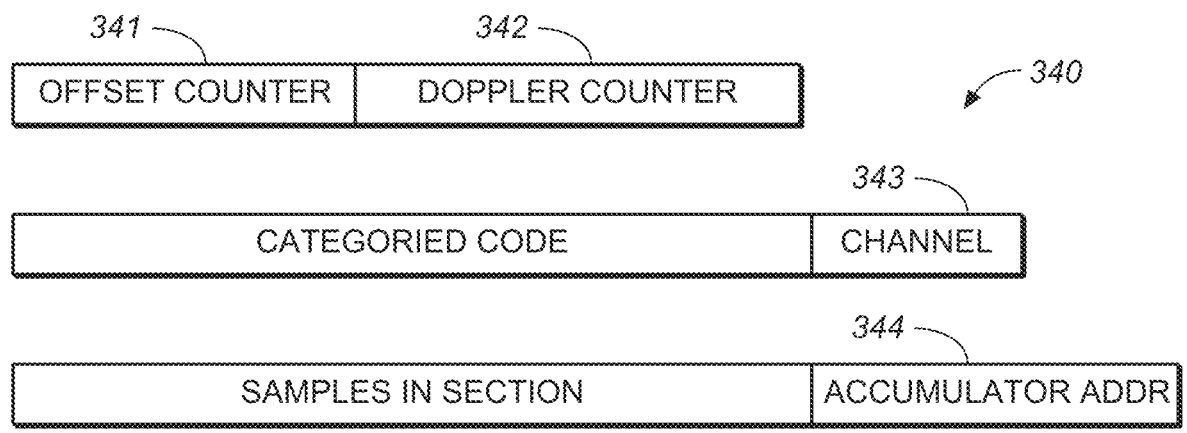
FIG. 3d shows data register that may be provided in dispatch circuit 302 to support implementation of functional representation 315.

Dispatch circuit 302 is a logic circuit that dispatches each section of the received signal to its assigned accumulator or accumulators for accumulation. As digital circuit 300 may be used to search for probe signals from multiple channels, each section of the received signal may be dispatched to numerous accumulators. Initially, CPU 301 may load into dispatch circuit 302 one or more PRN codes. Dispatch circuit 302 may divide a cycle of PRN code into the desired sections and categorize each section according to the predetermined code categories. Alternately, rather than providing PRN codes to dispatch circuit 302, CPU 301 may provide code category for each section of the PRN code cycle. In some embodiments, dispatch circuit may be provided gold code generators that can be configured to generate the desired PRN codes. Dispatch circuit 302 includes data registers for storing data required for assigning a section of received signal to composite categories of specified probe signals, based on the corresponding pairs of estimated code delay and estimated doppler frequency, and for dispatching the section of received signal to one or more of processing circuits 301-1, 301-2, . . . and 301-n for further processing FIG. 3b shows functional representation 315 of dispatch circuit 302 during section accumulations. FIG. 3d shows data registers that may be provided in dispatch circuit 302 to support implementation of functional representation 315. Initially, the code categories for the PRN code cycle and the identity of the corresponding search channel are provided in data register 343 (FIG. 3d). As shown in FIG. 3b, samples 316 of each section of a received signal may be retrieved from memory circuit 303 into dispatch circuit 302 (e.g., into a sample data portion of register 344 of FIG. 3d). In a GPS application, for example, under a 32 MHz sampling rate, 32 complex samples (i.e., both in-phase and quadrature samples) are provided in each section of 1-chip duration. Dispatch circuit 302 dispatches the received samples to an accumulator which address it maps as a function of the search parameters 317—i.e., the assigned channel, the estimated code delay and the doppler frequency (which determines the transitions of phase categories over time). Based on the estimated code delay, a section of the received signal is mapped to the cycle beginning of the PRN code of the assigned channel. Offset counter 341 (FIG. 3d) indicates offset 318 of the current section of the received signal relative to the beginning of the PRN code. Based on this offset, dispatch circuit 302 determines the code category. Phase counter 342, which is based on the estimated doppler frequency, indicates the phase category of the received section. The combination of the channel, the code category and the phase category allows dispatch circuit 302 to determine the destination accumulator that has been allocated by CPU 301 for the accumulation. The identification or address of the destination accumulator may be provided in the accumulator address portion of register 344 (FIG. 3d). The sample data and the accumulator address of register 344 may be provided on internal data bus 306 (FIG. 3a) to send the samples of the received signal to the destination accumulator.

FIG. 3c shows implementation 320 of an accumulator for supporting accumulation in any of processing circuits 304-1, 304-2, . . . and 304-n, in accordance with one embodiment of the present invention. As shown in FIG. 3c, samples of each section may be provided on data bus 324 (which may be part of internal data bus 306 of FIG. 3a). As mentioned above, each sample of each section are provided both in-phase and quadrature (e.g., 2 bits in each of the in-phase and quadrature components.) The in-phase and quadrature components of the sample are received into vector registers 325-I and 325-Q, respectively. Each of vector registers 325-I and 325-Q may include, for example, 32 2-bit sub-registers holding each holding a corresponding one of the 32 samples in the section. Accumulation registers 327-I and 327-Q hold corresponding accumulated vector sums of the in-phase and quadrature components of the samples in previously received sections. Vector summers 326-I and 326-Q adds the in-phase and quadrature components of the current section to the accumulated vector sums in accumulation registers 327-I and 327-Q. Each in-phase or quadrature component of each sample in accumulation registers 327-I and 327-Q may be, for example, 8-bit or 16-bit, as required, based in part on the expected length of the PRN code.

Figure 4:
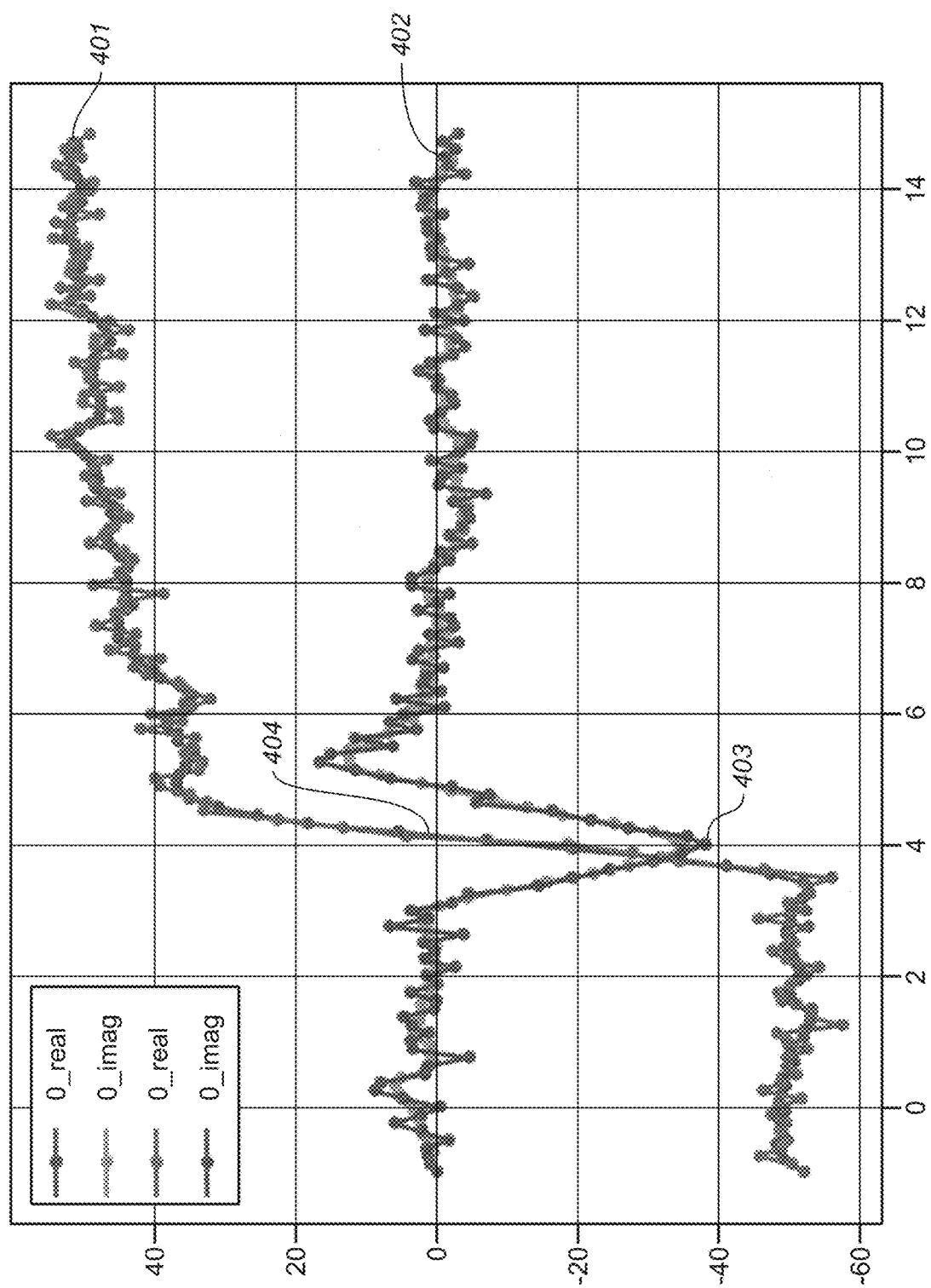
FIG. 4 shows waveform 401, corresponding the accumulated in-phase samples of a section of a received signal (i.e., the values in the real portion of the signal), and waveform 402, corresponding the accumulated quadrature samples of the same section of the received signal (i.e., the values in the imaginary portion of the signal).

As mentioned above, in each accumulator, a detected signal (i.e., the estimated code delay and the estimated doppler frequency are close to the actual code delay and the actual doppler frequency) results in the cumulative samples in each accumulator conform to the waveform of the corresponding bit transitions in the PRN code within the section. FIG. 4 shows waveform 401, corresponding the accumulated in-phase samples of a section of a received signal (i.e., the values in the real portion of the signal), and waveform 402, corresponding the accumulated quadrature samples of the same section of the received signal (i.e., the values in the imaginary portion of the signal). Note that the section of the PRN code corresponding to the section of the received signal in FIG. 4 includes a signal transition (e.g., from −1 to +1 or +1 to −1). Waveform 401 and waveform 402 resemble the step function and its derivative (i.e., the impulse function), respectively. In FIG. 4, waveform 402 has a peak (i.e., peak 403) that precedes the mid-point 404 of the signal transition in waveform 401. The inventor recognizes that, in this configuration, the received signal represents a superposition of signals arriving over multipaths, and peak 403 in waveform 402 represents its earliest arrival time.

The distance ("pseudorange") between the receiver and the position at which the received signal from transmitted from the satellite can be measured by the measured code delay times the speed of light c. If the receiver received the received signal at time t, then the satellite must have been transmitted from the satellite at GPS time t−τ, where τ is the actual code delay. The position of the satellite at GPS time t−τ may be accurately estimated from its ephemeris. The position and velocity of a receiver may be solved using measured pseudoranges of—typically—four or more satellites. The calculations involved may be carried out, for example, in processor 180 illustrated in FIG. 1a above. For example, in the book, *Global Positioning System: Signals, Measurement and Performance* ("Misra"), by P. Misra and P. Enge, Revised Second Edition, in Section 6.1, Misra provides a model for measured pseudorange $\rho^k(t, t-\tau)$ from satellite k, $1 \le k \le N$, $N \ge 4$:

$$\rho^k(t,t-\tau)=r(t,t-\tau)+c(\delta t_r(t)+\delta t_s(t-\tau))+A^k(t)+\varepsilon_\rho^k(t) \qquad (1)$$

where r(t, t−τ) is the actual pseudorange, $\delta t_r(t)$ and $\delta t_s(t-\tau)$ are the clock biases in the receiver and the satellite, respectively, $A^k(t)$ represents the atmospheric delay compensation factors and $\varepsilon_\rho^k(t)$ is a noise term, typically modeled as a Gaussian zero-mean noise. Collectively, the pseudoranges form pseudorange vector ρ(t) and their time derivatives form pseudorange time derivate vector $\dot{\rho}(t)$.

Receiver position and velocity vectors x and v may be modeled as system state variables of a dynamical system that may be solved using pseudorange vector ρ(t) and pseudorange time derivate vector $\dot{\rho}$(t), satellite ephemeris and statistical analysis techniques (e.g., a Kalman filter) known to those skilled in the art. See, e.g., Misra's section 6.2.

Equation (1) above may be rewritten as:

$$\rho^k(t,t-\tau)=|x^k-x|+c(\delta t_r(t)+\delta t_s(t-\tau))+A^k(t)+\varepsilon_\rho^k(t) \quad (2)$$

where $|x^k-x|$ is the actual pseudorange—expressed here as the Euclidean distance between satellite position vector $x^k$ and receiver position vector x. The time derivative of equation (2) relates satellite velocity vector $\upsilon^k$ with receiver velocity vector v:

$$\dot{\rho}^k(t,t-\tau)=|\upsilon^k-v|+c(\dot{\delta t}_r(t)+\dot{\delta t}_s(t-\tau))+\dot{A}^k(t)+\dot{\varepsilon}_\rho^k(t) \quad (3)$$

Figure 5:
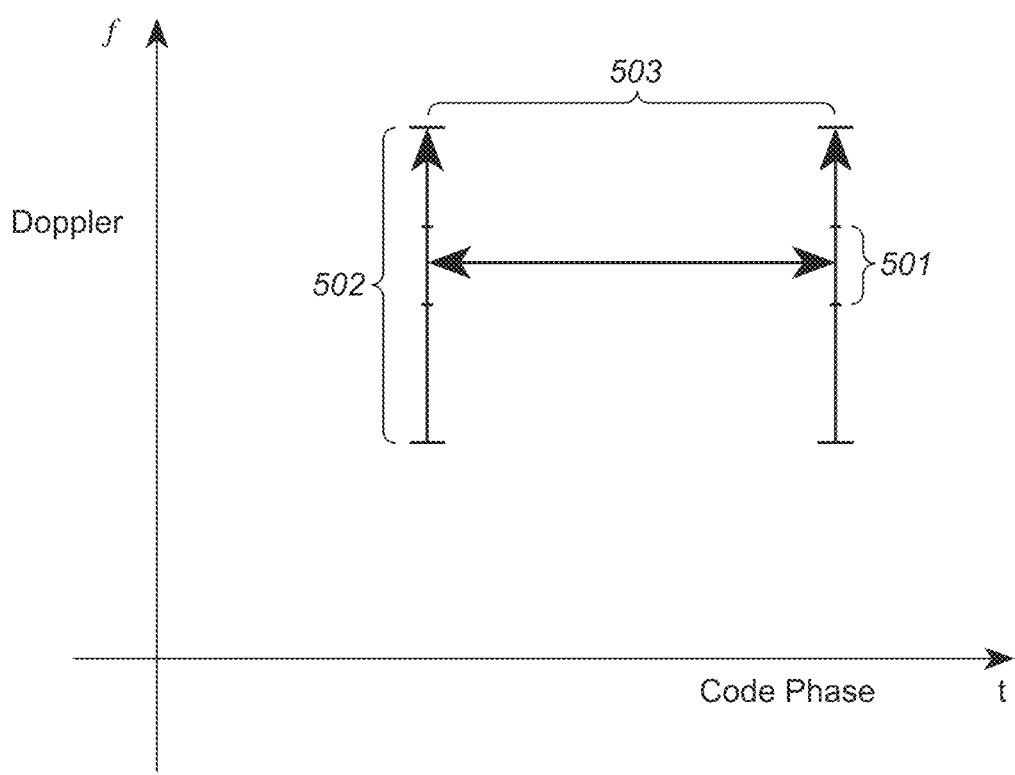
FIG. 5 illustrates the relative sizes of frequency search spaces in a satellite acquisition, showing frequency search space 501 due to uncertainty in relative velocity $|u^k-v|$ and frequency search space 502 due to uncertainties of all doppler components.

Thus, for each satellite, the observed doppler frequency—which is linearly related to the time rate of change of the pseudorange—is the sum of relative velocity ($\upsilon^k-v$) along the line-of-sight between the satellite and the receiver, satellite and receiver clock bias rates $\dot{\delta t}_r(t)$ and $\dot{\delta t}_s(t-\tau)$, and atmospheric compensation factors rate $\dot{A}^k(t)$. Among these doppler components, relative to receiver clock bias rate $\dot{\delta t}_r(t)$ and relative line-of-sight velocity $|\upsilon^k-v|$, satellite clock bias rate $\dot{\delta t}_s(t-\tau)$ and atmospheric compensation factors rate $\dot{A}^k(t)$ are typically small, assuming a high quality clock in the satellite and a relatively slow-changing meteorological model. As discussed above, IF signal 121 is the result of mixing the received signal with a fixed frequency signal generated by local oscillator 125 (typically, an TXCO). The stability of oscillator 125 is reflected in receiver clock bias rate $\dot{\delta t}_r(t)$. The uncertainty in relative velocity $|\upsilon^k-v|$ is dominated by satellite motion; this uncertainty is typically in the order of 100 KHz. The uncertainty in receiver clock bias rate $\dot{\delta t}_r(t)$, however, may be considerably larger. FIG. 5 illustrates the relative sizes of frequency search spaces in a satellite acquisition, showing frequency search space 501 due to uncertainty in relative velocity $|\upsilon^k-v|$ and frequency search space 502 due to uncertainties of all doppler components. Code phase search space 503 is also indicated in FIG. 5.

To reduce frequency search space 502, the prior art requires a high quality TXCO with a known limited drift, which adds additional cost to the receiver. However, this approach may render the receiver prohibitively expensive for may applications, such as IoT applications. Observing that the uncertainty due to the TCXO in the receiver is common to all satellites, a method according to the present invention requires the full extent of frequency search space 502 only during the initial acquisition of the first satellite in a cold start or warm start. Once the first satellite is successfully acquired, the values of receiver clock bias $\delta t_r(t)$ and receiver clock bias rate $\dot{\delta t}_r(t)$, together with their respective variances, as determined during the initial acquisition of the first satellite, are used in all subsequent satellite acquisitions. By this approach, the uncertainties—other than the uncertainties in the relative velocities of the respective satellites—are substantially removed, such that the likely required frequency search space spans only frequency search space 501. This method may be summarized as follows:

(i) initializing receiver position and velocity vectors x and v to best initial estimates, using a system model that includes receiver position and velocity vectors x and v, and receiver clock bias $\delta t_r(t)$ and receiver clock bias rate $\dot{\delta t}_r(t)$ as state variables of the system model;

(ii) acquiring a first satellite using a first frequency search space that spans both uncertainties due to the first satellite's orbit and uncertainties due to receiver clock bias $\delta t_r(t)$ and receiver clock bias rate $\dot{\delta t}_r(t)$;

(iii) setting the internal states corresponding to receiver clock bias $\delta t_r(t)$ and receiver clock bias rate $\dot{\delta t}_r(t)$ to their respective estimates obtained during the acquisition of the first satellite;

(iv) acquiring a second satellite using a second frequency search space that spans substantially only uncertainties due to the second satellite's orbit.

In some embodiments of the present invention, a Kalman filter implements the system model in which receiver position and velocity vectors x and v, and receiver and satellite clock biases $\delta t_r(t)$ are system state variables. In some embodiments, satellite clock biases $\delta t_s(t-\tau)$, and atmospheric compensation factors $A^k(t)$ and other factors affecting the measured pseudoranges may be provided as input variables, or separately handled. In the Kalman filter, system state variables x and v, and receiver clock bias $\delta t_r(t)$ and receiver clock bias rate $\dot{\delta t}_r(t)$, and their covariances are predicted from their corresponding current estimates and a noise model. These current estimates of the system variables and their covariances are, in turn, updated using their respective most recent estimates and measurements of pseudoranges and doppler frequencies of the respective satellites. For example, the current estimate of receiver clock bias rate $\dot{\delta t}_r(t)$ may be updated by a linear function of its most recent estimate and the measured dopplers.

The above detailed description is provided to illustrate specific embodiments of the present invention and is not intended to be limiting. Numerous variations and modifications within the scope of the present invention are possible. The present invention is set forth in the claims below.

I claim:

1. A satellite positioning system receiver receiving a signal comprising a plurality of probe signals transmitted from a plurality of satellites, wherein the satellite system receiver carries out a pseudo-range determination relative to each satellite, the satellite positioning receiver comprising:

a local oscillator having a bias in frequency that is reflected in each pseudo-range determination as a rate of change in a clock bias due to the satellite positioning system, wherein the local oscillator generates a signal of a predetermined frequency;

a front-end circuit having an analog mixer that mixes the generated signal of predetermined frequency with the received signal to provide an intermediate frequency (IF) signal;

a dispatch circuit that assigns, with respect to each probe signal, sections of the IF signal each to one of a plurality of categories;

a plurality of signal processing channel circuits each receiving the IF frequency signal, wherein each signal processing channel circuit is configurable to determine a code delay and a doppler frequency associated with one of the probe signals, wherein each signal processing channel circuit comprises a plurality of accumulators, and wherein each accumulator is selected to accumulate sections of the IF frequency signal of the same assigned category with respect to the associated probe signal; and a processing circuit, wherein the processing circuit, using the signal processing channel circuits, carries out a method that comprises:

(i) acquiring a first satellite using a first frequency search space that spans both uncertainties due to the first satellite's motion and uncertainties due to the time rate of change of the clock bias;

(ii) determining the clock bias or the time rate of change of the clock bias based on the acquiring of the first satellite, taking any frequency uncertainty due to the first satellite as a variable separate from the clock bias; and
(iii) using the clock bias or the time rate of change of the clock bias determined, acquiring a second satellite using a second frequency search space that spans substantially only uncertainties due to the second satellite's-motion.

2. The satellite positioning system receiver of claim 1, wherein the local oscillator comprises a temperature-compensated crystal oscillator.

3. The satellite positioning system receiver of claim 1, wherein the acquiring the first satellite provides a measurement of a distance from the first satellite which, along with satellite ephemeris data, is used to solve system state variables that include (i) an estimate of the receiver's position and (ii) an estimate of the clock bias or the time rate of change of the clock bias.

4. The satellite positioning system receiver of claim 3, wherein the system variables further comprise an estimate of the receiver's velocity.

5. The satellite positioning system receiver of claim 3, wherein code delays and doppler frequencies are determined in the signal processing channel circuits for a plurality of satellites.

6. The satellite positioning system receiver of claim 5, wherein solving the system state variables is achieved using a Kalman filter.

7. The satellite positioning system receiver of claim 6, wherein estimates of the clock bias, and atmospheric compensation factors are input variables to the Kalman filter.

8. The satellite positioning system receiver of claim 6, wherein the Kalman filter is based on a zero-mean Gaussian noise.

9. The satellite positioning system receiver of claim 6, wherein the estimate of the time derivative of the clock bias is updated in the Kalman filter using a linear function of one or more of the doppler frequencies.

10. In a satellite positioning system receiver that receives a signal comprising a plurality of probe signals transmitted from a plurality of satellites wherein the satellite positioning system receiver comprises a local oscillator that provides a signal of a predetermined frequency that is used to mix with the received signal to provide an intermediate frequency (IF) signal, the signal of the predetermined frequency having a bias in frequency that is reflected in a pseudo-range determination as a time rate of change of a clock bias due to the satellite positioning system receiver a method that comprises:
(i) acquiring a first satellite using a first frequency search space that spans both uncertainties due to the first satellite's motion and uncertainties due to the time rate of change of the clock bias; wherein, during the acquiring of the first satellite, sections of the IF signal are each assigned to one of a plurality of categories, and wherein the sections assigned to each category are accumulated separately from the sections not assigned to that category;
(ii) determining the clock bias or the time rate of change of the clock bias based on the acquiring of the first satellite, taking any frequency uncertainty due to the first satellite as a variable separate from the clock bias; and
(ii) using the clock bias or the time derivative of the clock bias determined, acquiring a second satellite using a second frequency search space that spans substantially only uncertainties due to the second satellite's motion.

11. The method of claim 10, wherein the local oscillator comprises a temperature-compensated crystal oscillator.

12. The method of claim 11, wherein acquiring the first satellite provides a measurement of a distance from the first satellite which, along with satellite ephemeris data, is used to solve system state variables that include (i) an estimate of the receiver's position and (ii) an estimate of the clock bias or the time rate of change of the clock bias.

13. The method of claim 12, wherein the system state variables further comprise an estimate of the receiver's velocity.

14. The method of claim 12, wherein the code delays and doppler frequencies are determined in the signal processing channel circuits for a plurality of satellites.

15. The method of claim 14, wherein solving the system state variables is achieved using a Kalman filter.

16. The method of claim 15, wherein estimates of the clock bias, and atmospheric compensation factors are input variables to the Kalman filter.

17. The method of claim 15, wherein the Kalman filter is based on a zero-mean Gaussian noise.

18. The method of claim 15, wherein the estimate of the time derivative of the clock bias is updated in the Kalman filter using a linear function of one or more of the doppler frequencies.

19. The satellite positioning system receiver of claim 1, wherein the dispatch circuit assigns the sections of the IF signal according to a category scheme that is based on an estimated code delay.

20. The satellite positioning system receiver of claim 19, wherein the category scheme is further based on an estimated doppler frequency.

21. The method of claim 10, wherein the sections of the IF signal are assigned according to a category scheme that is based on an estimated code delay.

22. The method of claim 21, wherein the category scheme is further based on an estimated doppler frequency.

* * * * *